United States Patent Office
3,830,859
Patented Aug. 20, 1974

3,830,859
PURIFICATION OF VINYL CHLORIDE
Ronnie D. Gordon, Gary R. Johnson, Joseph L. Skinner, and Bruce E. Leach, Ponca City, Okla., assignors to Continental Oil Company, Ponca City, Okla.
No Drawing. Filed Nov. 13, 1970, Ser. No. 89,526
Int. Cl. C07c 21/02
U.S. Cl. 260—656 R                               7 Claims

ABSTRACT OF THE DISCLOSURE

A process for the purification of vinyl chloride containing minor amounts of impurities such as butadiene, vinyl acetylene, and the like is provided which consists of intimately contacting the vinyl chloride stream with from about 0.01 to 1 weight percent of an acid constituent having a Hammett acidity function ($H_o$) of about —11 or less for an effective period of time at a temperature in the range of about 40–160° F. and then separating the substantially pure vinyl chloride from the acid constituent.

FIELD OF THE INVENTION

This invention relates to the purification of monomeric vinyl chloride. In one aspect the present invention relates to a process for the removal of impurities such as diolefins formed during the production of the monomeric vinyl chloride. In yet another aspect the present invention relates to a process for the removal of butadiene, vinyl acetylene, chloroprene and the like from monomeric vinyl chloride to provide a substantially pure vinyl chloride monomer which can be readily polymerized to polyvinyl chloride. In yet another aspect the present invention relates to a process for the removal of butadiene, vinyl acetylene, chloroprene and the like from vinyl chloride by contacting the vinyl chloride with from about 0.01 to 1 weight percent of an acid constituent having a Hammett acidity function ($H_o$) of about —11 or less for an effective period of time and at a temperature in the range of about 40 to 160° F. and then separating the substantially pure chloride from the acid constituent.

BRIEF DESCRIPTION OF THE PRIOR ART

As is well known, vinyl chloride is a monomer of considerable commercial importance in that it is employed to produce polyvinyl chloride commonly known as PVC. Several commercially available methods can be employed in the production of the vinyl chloride monomer. For example, vinyl chloride monomer can be produced by the addition reaction of acetylene and hydrogen chloride in the presence of suitable catalysts. Another commercially available process involves the pyrolysis of 1,2-dichloroethane in the presence of a suitable catalyst to produce the vinyl chloride monomer. Still another method for producing the vinyl chloride monomer is the thermal decomposition or pyrolysis of ethylene chloride by passing the ethylene chloride through an externally heated tube, or by the admixing of ethylene chloride with highly superheated vapors or by passing the ethylene chloride to molten catalytic baths. However, regardless of the method employed to produce the vinyl chloride certain impurities such as butadiene, vinyl acetylene, chloroprene and the like are present in minor amounts. For example, when the vinyl chloride monomer is produced by the addition reaction of acetylene and hydrogen chloride in the presence of a suitable catalyst the acetylene employed usually contains a minor amount of contaminants among which is butadiene. This diolefin impurity is carried throughout the process and remains in the monomer product. It has been determined that only traces of butadiene act to inhibit the polymerization rate of the vinyl chloride significantly or lead to the increased consumption of polymerization initiator, and thus means are constantly being sought to remove this impurity as well as the other polymerization inhibitor impurities produced by the particular process being employed to make the vinyl chloride monomer.

Several methods have been proposed in the prior art for removing the polymerization inhibitor impurities from the vinyl chloride monomer. One such method is disclosed in U.S. Pat. 2,626,177 entitled "Treatment of Monomeric Chloride" and assigned to The Dow Chemical Company, Midland, Mich. The process disclosed in this reference relates to the addition of sulfuric acid to the vinyl chloride to increase the polymerization rates of the vinyl chloride monomer. The reference discloses that the sulfuric acid is present in a concentration of from about 88 to 96 percent with the optimum concentration being above about 88 percent by weight.

While 88 to 96% sulfuric acid is effective in removing butadiene from vinyl chloride monomer, there are drawbacks to its use. Because of the relatively low reactivity of 88 to 96% sulfuric acid toward butadiene in vinyl chloride monomer either a relatively long sulfuric acid-vinyl chloride monomer contact time or the use of large amounts of sulfuric acid per volume of vinyl chloride monomer treated is necessary. Long sulfuric acid-vinyl chloride monomer contact times lead to the formation of undesirable by-products and vinyl chloride monomer losses. Large amounts of sulfuric acid, while more effectively removing butadiene, lead to higher equipment and acid costs. The use of stronger acids, acids with Hammett acidity functions of —11 or less such as oleum and chlorosulfonic acids, overcomes these drawbacks due to the enhanced rate of butadiene removal when stronger acids are used. Examples cited later will make these differences more evident.

Another process for the purification of vinyl chloride is disclosed in U.S. Pat. 3,125,607 entitled "Purification of Vinyl Chloride" and assigned to Monsanto Chemical Company, St. Louis, Mo. U.S. Pat. 3,125,607 discloses a method for the purification of vinyl chloride containing butadiene which involves the steps of contacting the vinyl chloride in the liquid phase with chlorine at a temperature within the range of about —20° C. to 0° C. Further, the reference teaches that the minimum quantity of chlorine required is the stoichiometric quantity necessary to react with all the butadiene present. It is further stated that the mole ratios of chlorine to butadiene of 1:1 to 5:1 are generally satisfactory for the purification of the vinyl chloride monomer.

U.S. 3,142,709 entitled "Purification of Vinyl Chloride" and assigned to Monsanto Chemical Company also discloses a process for producing vinyl chloride monomers substantially free of butadiene. The process employed in this reference for the purification of vinyl chloride containing a minor amount of butadiene consists of intimately contacting the vinyl chloride in the liquid phase with from about 0.5 to about 5 percent by weight hydrogen chloride at a temperature from 0 to about 100° C. for a period of time of about 5 minutes to 5 hours. The purified vinyl chloride is then recovered from the mixture by conventional fractionation techniques.

From the above references it is clearly evident that the removal of trace amounts of butadiene from vinyl chloride monomer is very desirable if one is to obtain a significant increase in the polymerization rate of vinyl chloride monomer at constant initiator levels. Alternatively one is able to use less initiator for the conversion of vinyl chloride monomer into polyvinyl chloride if butadiene is not present as an impurity. Therefore, new methods and treating agents are constantly being sought which will effectively remove the polymerization inhibitor impurities such as butadiene, vinyl acetylene, chloroprene and the like from vinyl chloride monomer and which will allow for an enhanced reaction rate for the conversion of monomer to polymer without increasing the chances of other undesirable by-products being formed due to unduly long contact times of the vinyl chloride monomer and the treating agent.

OBJECTS OF THE INVENTION

The object of the present invention is to provide a simple economical commercially feasible method for purifying vinyl chloride monomer to obtain a product essentially free from butadiene and other polymerization inhibitors.

This and other objects and advantages of the invention will become apparent to those skilled in the art from the reading of the following detailed description.

SUMMARY OF THE INVENTION

According to the present invention we have now found a method for removing polymerization inhibitor impurities from vinyl chloride monomer which comprises intimately contacting the vinyl chloride with from about 0.01 to 1 weight percent of an acid constituent having a Hammett acidity function ($H_o$) of about $-11$ or less for an effective period of time at a temperature in the range of 40–160° F. and then separating the substantially pure vinyl chloride from the reaction mixture.

DESCRIPTION OF PREFERRED EMBODIMENTS

Butadiene is a low level impurity formed in the manufacture of vinyl chloride monomer and this impurity interferes with the polymerization of vinyl chloride monomer polyvinyl chloride. In recent years new vinyl chloride monomer polymerization initiators have been developed which are superior to the conventional lauryl peroxide initiator in that the new initiators cause polymerization to proceed at a higher rate with less catalyst. However, in order to take full advantage of these new initiator systems one needs to have a vinyl chloride monomer essentially free of polymerization inhibitor impurities such as butadiene and vinyl acetylene. Therefore, there is a considerable incentive to produce vinyl chloride monomer free of polymerization inhibitor impurities.

With the objective in mind of producing a vinyl chloride monomer substantially free of butadiene and other polymerization inhibitor impurities we have found that by contacting vinyl chloride monomer with a minor amount of an acid having a Hammett acidity function ($H_o$) of about $-11$ or less for an effective period of time at a temperature in the range of about 40–160° F. that on subsequent separation of the vinyl chloride from the mixture a substantially pure monomer can be recovered which will readily polymerize to polyvinyl chloride.

The term Hammett acidity function designated as the symbol $H_o$ is a quantitative measure of acidity derived from ionization equilibrium of a particular class of indicators which behave in the Bronsted-Lowry sense as uncharged bases. Reference is made to the Hammett acidity function in the article by M. A. Paul and F. A. Long, Chemical Reviews, 57, 1, 1957. The Hammett acidity function ($H_o$) is defined by the equation $$H_o \equiv pK_{BH^+} + \log \frac{C_{BH^+}}{C_B}$$

where $C_{BH^+}C_B$ is the directly observable concentration ratio of the indicator in its two differently colored forms and $pK_{BH^+}$ is the thermodynamic ionization constant of its conjugate acid in terms of molar concentrations, referred to ideal dilute solutions in water.

In general the acid constituent to be employed for the removal of butadiene from vinyl chloride monomer can be any acid having an acid strength measured and expressed in terms of Hammett's acidity function ($H_o$) of $-11$ or less. As is evident to those skilled in the art the stronger acids have larger negative numbers and thus is an explanation of the limitation of a Hammett acidity function of $-11$ or less. In addition to having the desired Hammett acidity value the acid should also be one which is separable from vinyl chloride monomer. Separation techniques which are well known in the art can be employed such as gravity, distillation, electrostatic precipitation, or centrifugal type separation. If the added acid is not properly separated it, in our process, is carried with vinyl chloride monomer into an aqueous caustic wash. The aqueous caustic wash could be used as a method to neutralize and remove acid. However, this leads to an increased sodium hydroxide cost, contaminates the aqueous sodium hydroxide if it is to be used for other plant functions and may lead to the introduction of other impurities in the treated vinyl chloride monomer. However, under proper conditions and certain circumstances the method of neutralizing the acid by the aqueous caustic wash could be employed. However, the purpose of the caustic wash is to remove trace amounts of dissolved or entrained acid.

The acids which can be employed in the practice of the present invention can be both organic acids and mineral acids, the only criteria being that they have a Hammett's acidity function ($H_o$) of $-11$ or less. The most desired acid constituent of the process of the present invention are oleum (sulfuric acid containing excess $SO_3$), and chlorosulfonic acid.

The process of the present invention will be described wherein the vinyl chloride monomer is maintained in a liquid phase. It is also contemplated and apparent to those skilled in the art that such a process can be carried out for a treatment of vinyl chloride monomer in the vapor phase under proper conditions. However, desirable results have been obtained wherein such process is carried out on vinyl chloride monomer in the liquid phase because one does not need to vaporize the vinyl chloride monomer under pressure and maintain it in the vapor phase throughout the treatment process. Also vinyl chloride monomer may be treated when part of a mixture, such as a stream composed of vinyl chloride monomer and 1,2-dichloroethane. When such a mixture is treated by the process of the present invention the vinyl chloride monomer is present in an amount of at least 25 volume percent of the total mixture.

As previously stated, the process of the present invention encompasses the treatment of a vinyl chloride monomer stream with from about 0.1 to 1 percent by weight of an acid as hereinabove defined for an effective period of time at a temperature within the range of about 40 to 160° F. and then separating the substantially pure vinyl chloride monomer from the acid constituent of the reaction mixture. While the temperature of the vinyl chloride monomer may vary widely within the ranges described above generally a temperature within the range of about 65 to 135° F. has been found desirable. When necessary to heat or cool the vinyl chloride monomer stream prior to the contacting of same with an acid to bring the feed stream within the desired temperature it may be desirable to pass the vinyl chloride monomer feed stream through a heat exchanger zone.

When the acid constituent is introduced into the reactor with the vinyl chloride monomer feedstream the acid will generally be at ambient temperatures and the amount of the acid will vary depending upon the type of acids used, but generally the amount of acid is in the range of from about 0.01 to 1 percent based on the weight of the vinyl chloride monomer. When the acid and vinyl chloride monomer are contacted it is desirable that the acid be thoroughly dispersed throughout the vinyl chloride monomer to provide intimate contact of the acid with the vinyl chloride monomer. This despersion can take place by any suitable means known in the art such as adequate stirring and the like.

Once the acid has been contacted with the vinyl chloride monomer at a temperature within the range of about 40 to 160° F. for an effective period of time, generally from about 0.5 second to 1800 seconds, the vinyl chloride monomer acid stream is then passed into a separation zone for recovery of substantially pure vinyl chloride monomer from the spent acid. Any suitable separation technique can be employed in the separation of the purified vinyl chloride monomer from the spent acid solution. The methods of separation will vary widely depending upon the particular acid employed. Desirable results have been obtained wherein the vinyl chloride monomer acid stream is passed into a gravity-type separator of sufficient size to allow the vinyl chloride monomer to separate into a separate phase from the spent acid phase. The rate of acid separation (settling) in such a system is dependent largely upon the geometry of the reactor design, the velocity of the vinyl chloride monomer through separator, and the difference in specific gravity between the acid employed in the treatment step and the vinyl chloride monomer. When the acid employed is such that gravity separation is not feasible due to the lack of difference in the specific gravity of the acid and the vinyl chloride monomer other separation techniques such as distillation, centrifugal force, and electrostatic precipitation can be employed.

After removal of the purified vinyl chloride monomer from the vinyl chloride monomer-spent acid solution the purified monomer is contacted with a caustic wash to remove any traces from residual acid. Any suitable caustic wash can be employed such as sodium hydroxide and these caustic washes are well known in the art. Generally the caustic wash will be an aqueous solution containing from about 0.1 to 20 weight percent sodium hydroxide. Especially desirable results have been obtained wherein the aqueous sodium hydroxide solution contains from about 1 to 5 weight percent sodium hydroxide. After the purified vinyl chloride monomer has been washed with the caustic wash the vinyl chloride monomer is separated from the caustic wash solution. The caustic washed vinyl chloride monomer is then passed through a flake caustic (NaOH) dryer to remove substantially all of the moisture present in the vinyl chloride monomer. Other suitable drying agents can be employed such as calcium chloride or calcium sulfate.

separator. In the separator the spent acid settled to the bottom and the treated vinyl chloride monomer formed an upper phase. The spent acid phase was withdrawn from the separator intermittently every 30 minutes. The vinyl chloride monomer phase was moved upwardly at a velocity at about 1 foot per minute thus maintaining a residence time in the separator of about 2.5 minutes. The separator was run liquid full and at a temperature of about 90° F. The overhead vinyl chloride monomer was drawn from the separator and then run through a standard caustic treatment. In the standard caustic treatment the first vessel was a neutralizer filled to 50% level with an aqueous alkali solution containing 5 percent sodium hydroxide. The vinyl chloride monomer, which was slightly acidic, was fed into the bottom of the first vessel. The vinyl chloride monomer was sparged with sufficient velocity into the first vessel to give good contacting of the two immiscible liquids thereby removing traces of the acid in the vinyl chloride monomer. A liquid-liquid interface was formed approximately halfway up the side of the first vessel since the upper 50% of the vessel was full of vinyl chloride monomer. The first vessel was designed so as to maintain about a 2.5 minutes residence time in same for the vinyl chloride monomer while the vinyl chloride monomer was moving upwardly at a rate of about 0.2 feet per minute. The overhead vinyl chloride monomer stream was drawn from the first vessel and then run through a trap where water and entrained caustic was removed. Effluent from the trap was then fed into the bottom of a flake caustic bed. This caustic bed dries the vinyl chloride monomer to less than 100 parts per million water and was designed so as to allow the vinyl chloride monomer to remain within said bed for about 5 minutes. The caustic bed was operated at a temperature of about 90° F. and effluent from the bed is the final treated vinyl chloride monomer product listed in the Table I below. The entire process outlined in the experience was operated at a pressure of 160 p.s.i.g. to ensure liquid phase at all points in the process.

TABLE I

| VCM feed rate, ml./min. | Acid feed rate, ml./hr. | Type of acid | Mixer temp., °F. | Mixer r.p.m. | System press., p.s.i.g. | 1,3-butadiene, p.p.m. in VCM |
|---|---|---|---|---|---|---|
| VCM feed to unit | | | | | | 10.3 |
| 800 | 11.4 | Chlorosulfonic | 115 | 1,350 | 160 | 0.8 |
| 400 | 10.2 | 20% oleum | 115 | 1,350 | 160 | 1.8 |
| 400 | 10.0 | do | 65 | 1,350 | 160 | 0.1 |
| 400 | 10.0 | 96% sulfuric | 90 | 1,350 | 160 | 7.0 |

In order to more fully demonstrate the present invention the following example is given. However, it is to be understood that the example is for illustrative purposes only and is not to be construed as limiting the scope of the present invention.

EXAMPLE

A series of experiments were conducted employing the process of the present invention for removing 1,3-butadiene from vinyl chloride monomer. In each experiment the general process was the same but various process variables were modified as well as the acid constituent. These variables are tabulated in the Table I described hereinafter. In each experiment the vinyl chloride monomer containing a predetermined amount of 1,3-butadiene was metered into an in-line mixer run at 1350 r.p.m. Prior to mixing, the vinyl chloride monomer feed stream was passed through a heat exchanger so as to maintain a predetermined temperature within the mixer. The acid employed was then metered into the in-line mixer at ambient temperature. The mixture was agitated to ensure complete dispersion of the acid in the vinyl chloride in the mixer for about 12 seconds. The total acid/vinyl chloride monomer mixture was then withdrawn from the mixer and transferred to an acid-vinyl chloride monomer The reactivity of the acids, the amount of acid required to remove the 1,3 butadiene to a 1 p.p.m. level, was found to be chlorosulfonic acid having the greatest reactivity and about 20% oleum exhibited the next best reactivity. Further, the information disclosed in the experiments indicated that acids having a Hammett acidity function ($H_0$) of $-11$ or less effectively removed the 1,3 butadiene from the vinyl chloride monomer whereas when substantially the same amount of 96% sulfuric acid, having a Hammett acidity function ($H_0$) of $-9.36$ was employed as the acid, the 1,3-butadiene remaining in the vinyl chloride monomer was lowered to only 7 parts per million from the initial 10.3 p.p.m. originally present. Thus, it is clearly evident from the above example that the use of acids having a Hammett acidity function ($H_0$) of $-11$ or less provide greatly improved results over the use of sulfuric acid.

As is evident the process of the present invention provides for the removal of 1,3-butadiene and provides a treated vinyl chloride monomer of substantially improved quality.

The foregoing discussion and description have been made in connection with preferred specific embodiments of the process for the removal of polymerization inhibitor impurities from vinyl chloride monomer. However, it is

We claim:

1. A process for purifying impure vinyl chloride having as impurities therein butadiene, vinyl acetylene or mixtures thereof, said process comprising intimately contacting said impure vinyl chloride with an acid selected from the group consisting of oleum and chlorosulfonic acid and recovering vinyl chloride of improved purity from the resulting mixture.

2. The process of Claim 1 wherein said acid and said vinyl chloride are contacted for a period of time of about 0.5 to 1800 seconds and at a temperature within the range of about 40–160° F.

3. The process of Claim 2 wherein said acid is present in an amount of from about 0.01 to 1 weight percent based on weight of vinyl chloride.

4. The process of Claim 3 wherein said temperature is in the range of about 65 to 135° F.

5. The process of Claim 4 wherein the step of separating the vinyl chloride from the acid-vinyl chloride mixture includes passing the mixture into a gravity settling zone thereby allowing the vinyl chloride and acid to form two phases, withdrawing the vinyl chloride phase and washing same with a caustic wash solution to remove traces of residual acid, separating from caustic wash solution and passing the separated vinyl chloride through a drying agent to remove any traces of moisture remaining therein.

6. The process of Claim 5 wherein said caustic wash solution is an aqueous solution containing from about 0.1 to 20 weight percent sodium hydroxide and said drying zone contains flaked caustic agent.

7. The process according to Claim 6 wherein said vinyl chloride is present in a mixture of vinyl chloride monomer and 1,2-dichloroethane and said mixture contains at least 25 volume percent vinyl chloride monomer.

References Cited

UNITED STATES PATENTS 2,266,177  12/1941  Dosser _____ 260—656

FOREIGN PATENTS 939,936  10/1963  Great Britain _____ 260—656
956,618  4/1964  Great Britain _____ 260—656

OTHER REFERENCES

"Sulfonation and Related Reactions," Gilbert (1965), p. 60.

LEON ZITVER, Primary Examiner

A. SIEGEL, Assistant Examiner